United States Patent
Choi

(10) Patent No.: US 12,377,798 B2
(45) Date of Patent: Aug. 5, 2025

(54) VEHICLE COCKPIT MODULE

(71) Applicant: HYUNDAI MOBIS CO., LTD., Seoul (KR)

(72) Inventor: Ik Keun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 352 days.

(21) Appl. No.: 17/890,862

(22) Filed: Aug. 18, 2022

(65) Prior Publication Data

US 2023/0211665 A1 Jul. 6, 2023

(30) Foreign Application Priority Data

Dec. 30, 2021 (KR) .................. 10-2021-0191998

(51) Int. Cl.
*B60K 37/20* (2024.01)
*B60K 35/50* (2024.01)
(Continued)

(52) U.S. Cl.
CPC .............. *B60K 35/50* (2024.01); *B60K 37/20* (2024.01); *B60R 16/0207* (2013.01);
(Continued)

(58) Field of Classification Search
CPC ........ B60K 35/50; B60K 37/00; B60K 37/10; B60K 37/20; B60K 2360/658;
(Continued)

(56) References Cited

U.S. PATENT DOCUMENTS 4,355,820 A * 10/1982 Kitagawa .................. B62D 1/16
280/779
5,915,776 A * 6/1999 Bieri .......................... B60R 7/10
296/70
(Continued)

FOREIGN PATENT DOCUMENTS

CN 108973683 A * 12/2018 ............. B60K 37/04
DE 10033050 A1 * 1/2002 ............. B60K 37/00
(Continued)

OTHER PUBLICATIONS

Rennert (DE 10033050 A1), machine translation (Year: 2002).*
(Continued)

*Primary Examiner* — Amy R Weisberg
*Assistant Examiner* — Wenwei Zhuo
(74) *Attorney, Agent, or Firm* — NSIP Law

(57) ABSTRACT

A vehicle cockpit module assembled to a front area of the interior of a vehicle, the vehicle cockpit module including a main module composed of a driver module corresponding to a driver seat and a center module disposed at a center of the vehicle, and comprising vehicle control parts, driver seat convenience parts, and driver seat safety parts, and a side module configured to be assembled to or separated from a side of the main module corresponding to a front passenger seat, and comprising front passenger seat convenience parts and front passenger seat safety parts, wherein the side module is configured to be connected to a front part of a vehicle body and a side end of the main module when
(Continued)

assembled, and a space in which the side module previously existed is utilized as a storage space, in response to the side module being separated.

10 Claims, 8 Drawing Sheets

(51) Int. Cl.
  *B60R 16/02* (2006.01)
  *B60R 16/023* (2006.01)
  *B62D 25/08* (2006.01)
(52) U.S. Cl.
  CPC .......... *B60R 16/023* (2013.01); *B62D 25/081* (2013.01); *B60K 2360/658* (2024.01)
(58) Field of Classification Search
  CPC .......... B60K 2360/60; B60K 2360/693; B60K 2360/84; B62D 25/081; B62D 25/14; B62D 25/142; B62D 25/145; B62D 25/147; B60R 16/0207; B60R 16/023
  USPC ................ 296/192, 70, 72, 73, 74; 180/90
  See application file for complete search history.

(56) References Cited

U.S. PATENT DOCUMENTS

| | | | | |
|---|---|---|---|---|
| 6,296,303 | B1 * | 10/2001 | Kamiya | B60H 1/00542 296/72 |
| 6,474,716 | B2 * | 11/2002 | Shikata | B60R 16/0215 296/70 |
| 6,488,330 | B2 * | 12/2002 | Hedderly | B60K 37/00 296/72 |
| 7,607,691 | B2 * | 10/2009 | Arnold | B29C 33/52 280/751 |
| 7,823,952 | B2 * | 11/2010 | Utsugi | B60K 35/00 296/70 |
| 2001/0030435 | A1 * | 10/2001 | Burns | B60K 37/00 296/70 |
| 2002/0017410 | A1 * | 2/2002 | Larsson | B60K 37/20 296/70 |
| 2007/0188023 | A1 * | 8/2007 | Kraus | B60K 35/22 307/10.1 |
| 2007/0290524 | A1 * | 12/2007 | Szoke | B62D 25/145 296/190.08 |
| 2008/0315612 | A1 * | 12/2008 | D'Alessandro | B60R 13/0256 296/72 |
| 2011/0187157 | A1 * | 8/2011 | Yamazaki | B60H 1/00564 296/208 |
| 2012/0274090 | A1 * | 11/2012 | Carter | B60H 1/0055 296/70 |
| 2013/0270886 | A1 * | 10/2013 | Kim | B60N 3/06 297/423.1 |
| 2024/0140202 | A1 * | 5/2024 | Park | B60K 35/00 |

FOREIGN PATENT DOCUMENTS

| | | | | |
|---|---|---|---|---|
| DE | 102013013356 A1 | * | 4/2014 | .......... B62D 25/145 |
| DE | 102016224495 A1 | * | 6/2018 | |
| FR | 2765175 A1 | * | 12/1998 | ............ B60K 37/00 |
| FR | 2941655 A1 | * | 8/2010 | ............ B60K 37/00 |
| FR | 2984245 A1 | * | 6/2013 | ............ B60K 37/00 |
| JP | S61104256 U | * | 7/1986 | |
| WO | WO-2013144463 A1 | * | 10/2013 | ............ B60K 37/00 |

OTHER PUBLICATIONS

Werner (DE 102013013356 A1), machine translation (Year: 2014).*
Rousseau et al. (FR 2984245 A1), machine translation (Year: 2013).*
Chen et al. (CN 108973683 A), machine translation (Year: 2018).*

* cited by examiner

VEHICLE COCKPIT MODULE

CROSS REFERENCE TO RELATED APPLICATION

This application claims the benefit under 35 USC § 119(a) of Korean Patent Application No. 10-2021-0191998, filed Dec. 30, 2021, the entire disclosure of which is incorporated herein by reference for all purposes

BACKGROUND OF THE DISCLOSURE

1. Field

The present disclosure relates generally to a vehicle cockpit module and, more particularly, to a technology for separating a cockpit on a driver seat side and a center fascia side from a cockpit on a front passenger seat side to modularize the cockpits into individual modules.

2. Description of Related Art

A cockpit module includes a cowl cross bar that traverses the width of a vehicle and is provided inside a crash pad to prevent an engine, etc. from being pushed into the interior of the vehicle during a vehicle collision.

Carbon fiber reinforced plastic (CFRP) structures have been developed as a replacement for the cowl cross bar to reduce the weight of the vehicle. In this case, however, the manufacturing cost increases due to the characteristics of the CFRP structure and thus mass production of various types of vehicles is limited. In an effort to overcome such limitation, research on alternative structures that can be subjected to solution treatment and can replace the cowl cross bar is actively conducted.

The foregoing is intended merely to aid in the understanding of the background of the present disclosure, and is not intended to mean that the present disclosure falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a vehicle cockpit module for a front part of an interior of a vehicle, the vehicle cockpit module including a main module composed of a driver module corresponding to a driver seat and a center module disposed at a center of the vehicle, and comprising vehicle control parts, driver seat convenience parts, and driver seat safety parts, and a side module configured to be assembled to or separated from a side of the main module corresponding to a front passenger seat, and comprising front passenger seat convenience parts and front passenger seat safety parts, wherein the side module is configured to be connected to a front part of a vehicle body and a side end of the main module when assembled, and a space in which the side module previously existed is utilized as a storage space, in response to the side module being separated.

The driver module may include a driver seat vent, the center module may include a center vent, the main module may include a first duct connecting the driver seat vent and the center vent with each other, and an air conditioning device may include a blower and a heat exchanger connected to the first duct is disposed at a front side of the main module and located inside an engine room of the vehicle.

The side module include a front passenger seat vent and a second duct connecting the front passenger seat vent and the first duct to each other.

The second duct may be connected to the first duct in a front-and-rear direction of the vehicle.

The main module include a cowl cross member extending from a front side thereof in a left-and-right direction of the vehicle, and the vehicle control parts, the driver seat convenience parts, and the driver seat safety parts may be coupled to the cowl cross member.

The side module may be disposed in the vehicle and coupled to the main module, in response to a front passenger seat being occupied by an occupant, and may not be disposed in a vehicle, in response to the front passenger seat not being occupied by an occupant.

The vehicle cockpit module include a connecting part extending from front sides of the main module and the side module in a left-and-right direction of the vehicle and configured to electrically connect the main module and the side module to each other.

The connecting part include a main wiring extending inside the main module in the left-and-right direction of the vehicle and connected to the main module, and a sub-wiring may extend from a rear side of the side module in the left-and-right direction of the vehicle and may be connected to an end of the main wiring, wherein the sub-wiring may receive control signals and power for the front passenger seat convenience parts and the front passenger seat safety parts from the main wiring.

The side module include a side bracket configured to be coupled to the vehicle body, and the front passenger seat convenience parts and the front passenger seat safety parts may be configured to be coupled to the side bracket.

The vehicle cockpit module include a covering part configured to cover an end of the main module and an end of the side module while connecting the ends to each other, in response to the side module being disposed at the side of the main module.

The main module may have a first indented portion indented outwardly at an end thereof, and the covering part include a first cover having a first projecting portion configured to be inserted into the first indented portion and projecting rearwardly at a position corresponding to the main module, a second indented portion indented outwardly at a position corresponding to the side module, and a second cover connected to the side module and having a second projecting portion projecting from an end thereof and configured to be inserted into the second indented portion of the first cover.

A clip portion may project from a rear side to a front side of the first projecting portion of the first cover is fastened to the first indented portion, and the second indented portion may be fastened to the first indented portion by a bolt.

Other features and aspects will be apparent from the following detailed description, the drawings, and the claims.

Figure 1:
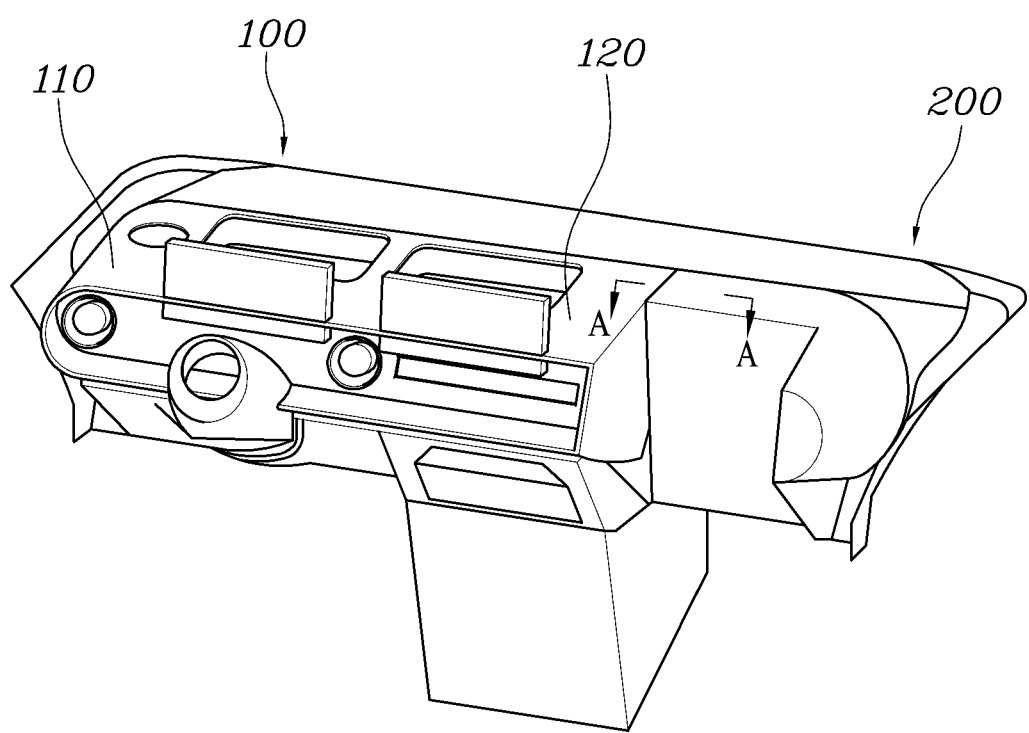
FIG. 1 is a perspective view illustrating a vehicle cockpit module according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although the terms "first" and/or "second" may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a," "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, an exemplary embodiment of the present disclosure will be described in detail with reference to the accompanying drawings. Throughout the drawings, the same reference numerals will refer to the same or like parts.

Figure 2:
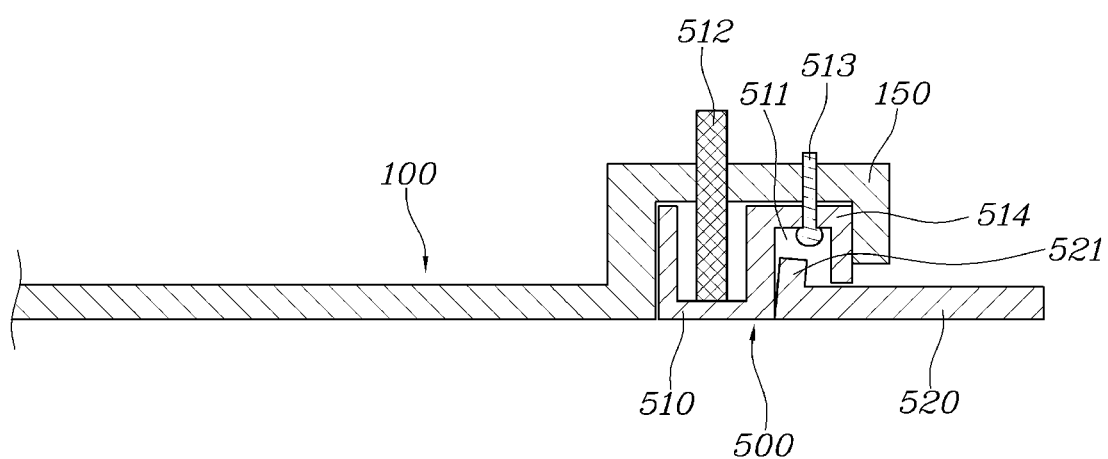
FIG. 2 is a sectional view taken along the line A-A of FIG. 1.
Figure 3:
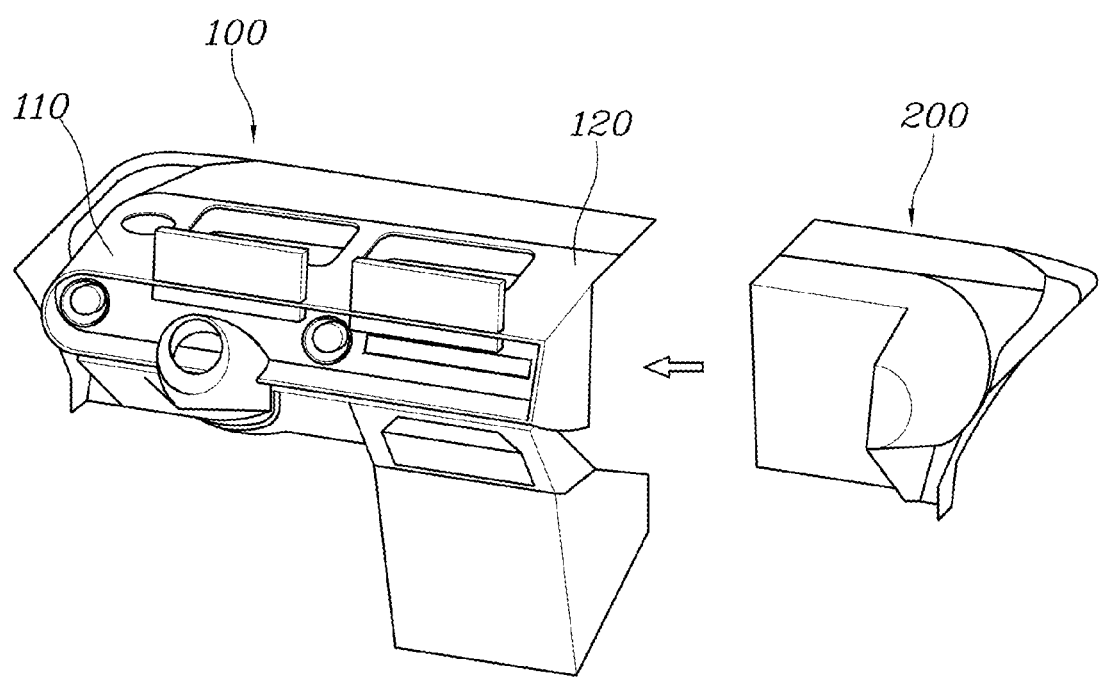
FIG. 3 is a perspective view illustrating a disassembled state of the vehicle cockpit module according to the present disclosure.
Figure 4:
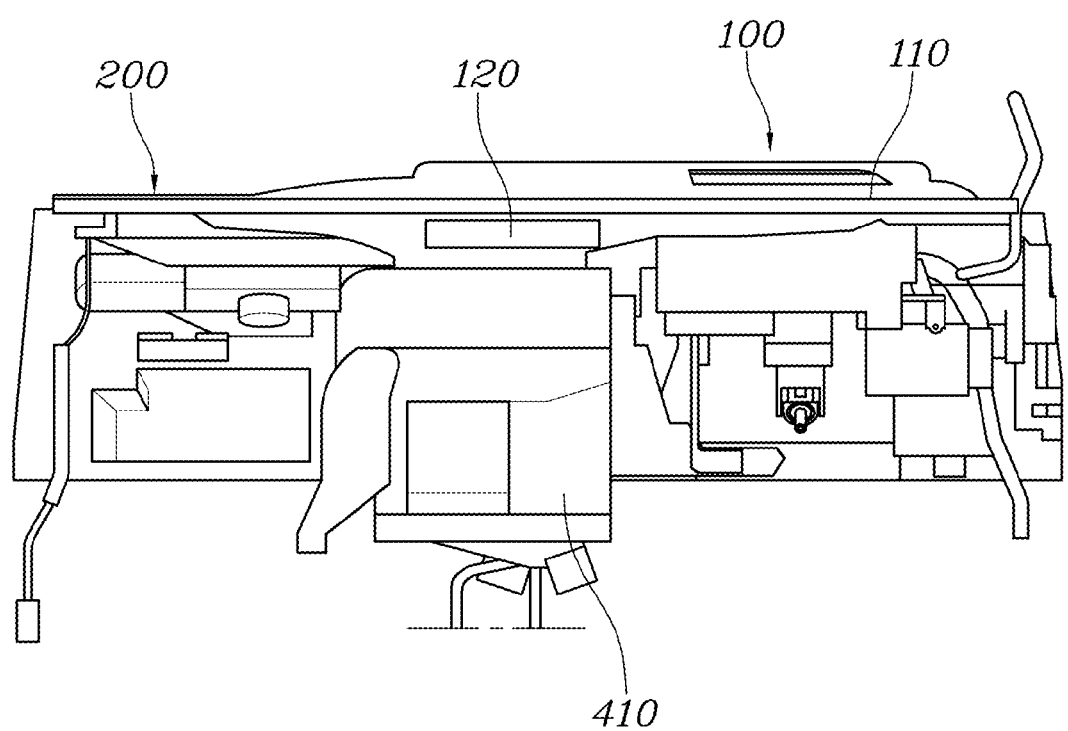
FIG. 4 is a rear view illustrating that a heat exchanger is coupled to the vehicle cockpit module according to the embodiment of the present disclosure.
Figure 5:
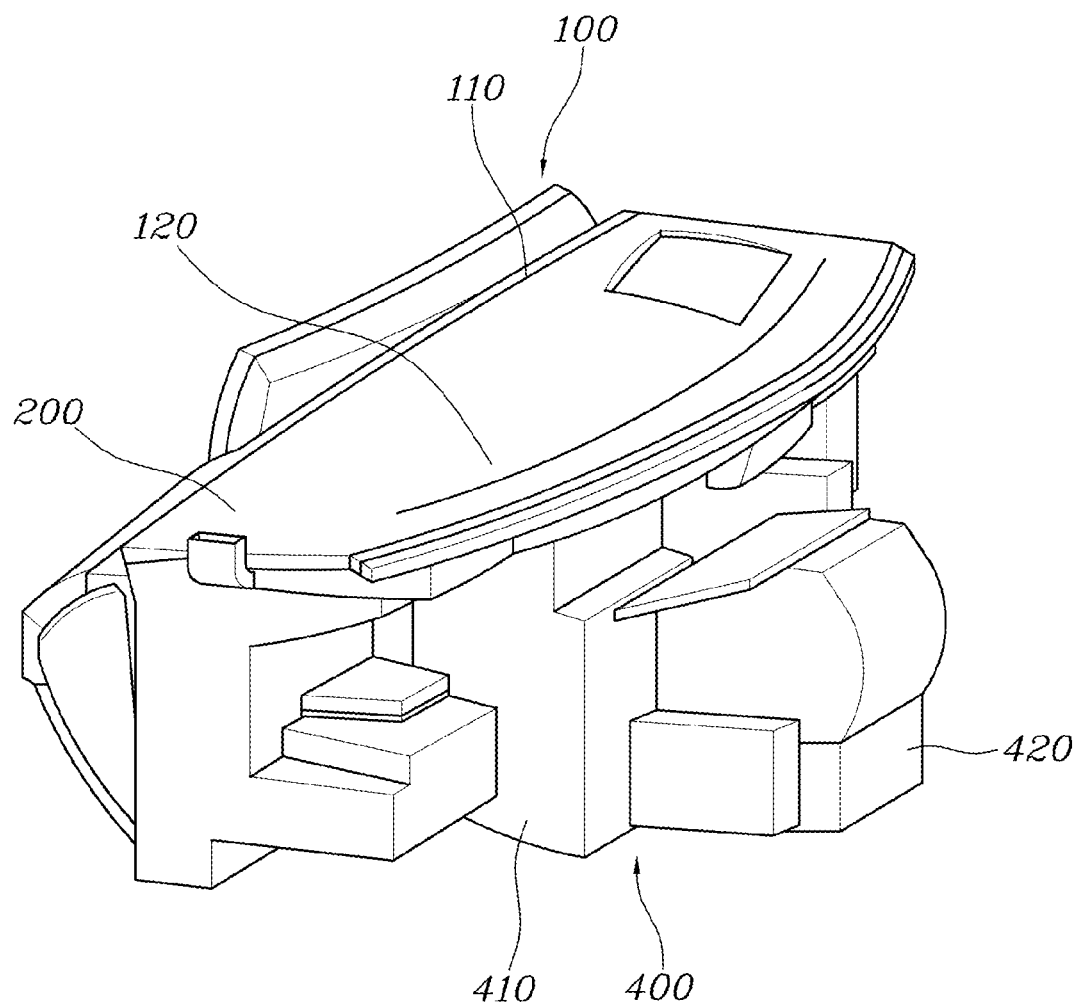
FIG. 5 is a rear perspective view illustrating that the heat exchanger and a blower are coupled to the vehicle cockpit module according to the embodiment of the present disclosure.
Figure 6:
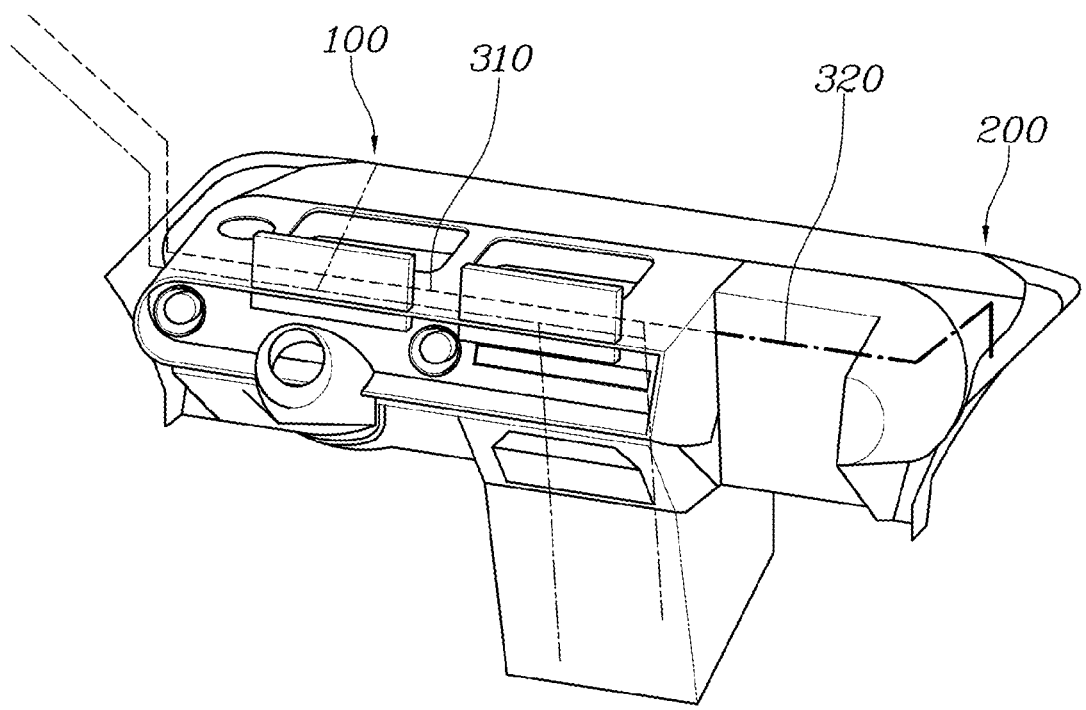
FIG. 6 is a view illustrating that a wiring is connected to the vehicle cockpit module according to the embodiment of the present disclosure.
Figure 7:
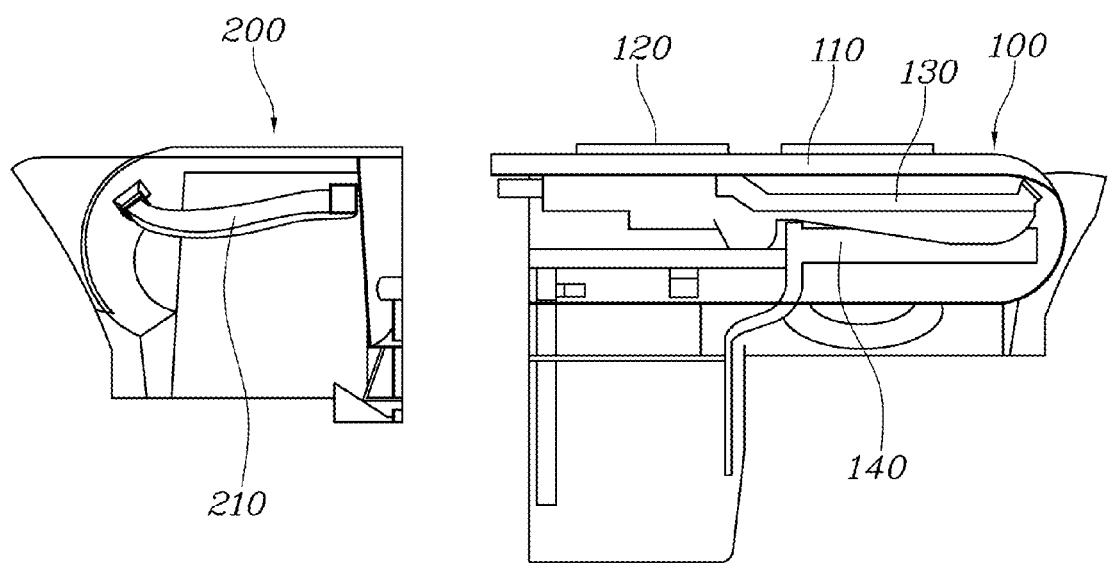
FIG. 7 is a rear view illustrating that a first duct and a second duct of the vehicle cockpit module according to the embodiment of the present disclosure are connected.
Figure 8:
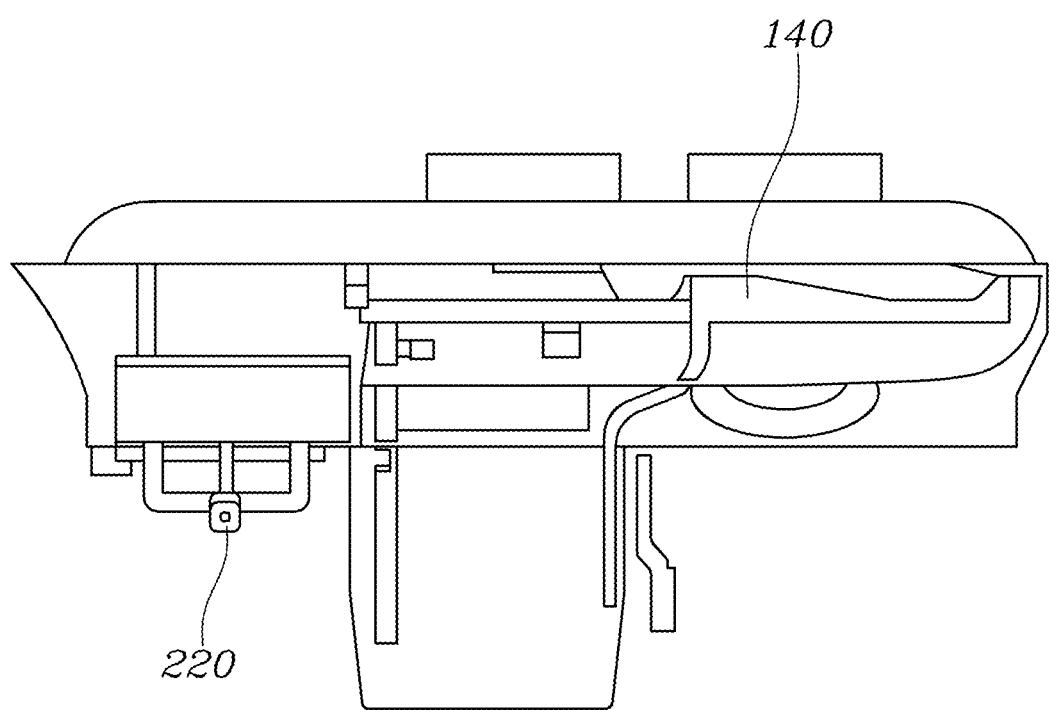
FIG. 8 is a rear view illustrating that the vehicle cockpit module according to the embodiment of the present disclosure is coupled to a vehicle.

FIG. 1 is a perspective view illustrating a vehicle cockpit module according to an embodiment of the present disclosure. FIG. 2 is a sectional view taken along the line A-A of FIG. 1. FIG. 3 is a perspective view illustrating a disassembled state of the vehicle cockpit module according to the present disclosure. FIG. 4 is a rear view illustrating that a heat exchanger 410 is coupled to the vehicle cockpit module according to the embodiment of the present disclosure. FIG. 5 is a rear perspective view illustrating that the heat exchanger 410 and a blower 420 are coupled to the vehicle cockpit module according to the embodiment of the present disclosure. FIG. 6 is a view illustrating that a wiring is connected to the vehicle cockpit module according to the embodiment of the present disclosure. FIG. 7 is a rear view illustrating that a first duct 130 and a second duct 210 of the vehicle cockpit module according to the embodiment of the present disclosure are connected. FIG. 8 is a rear view illustrating that the vehicle cockpit module according to the embodiment of the present disclosure is coupled to a vehicle.

An exemplary embodiment of the vehicle cockpit module according to the present disclosure will be described with reference to FIGS. 1 to 8.

A conventional vehicle is manufactured on the assumption that both a driver seat and a front passenger seat are occupied by occupants. Accordingly, a cockpit module that includes a dashboard separating an engine room from the interior of the vehicle is designed to extend from the driver seat to the front passenger seat, and have a plurality of control parts and convenience parts of the vehicle.

However, as many vehicles have been recently often used as transport vehicles, etc. in which a front passenger seat is not occupied by an occupant depending on the purpose of the vehicle, convenience parts provided in front of the front passenger seat become unnecessary, thereby increasing the manufacturing cost of the vehicle.

In an effort to solve such a problem, the present disclosure is designed to separate a cockpit module in front of a driver seat and a cockpit module in front of a front passenger seat from each other, and to determine whether they are to be coupled in the manufacturing line during manufacturing depending on the purpose of the vehicle.

The vehicle cockpit module according to the present disclosure is a vehicle cockpit module assembled to a front part of the interior of a vehicle, and may include: a main module 100 composed of a driver module 110 corresponding to a driver seat and a center module 120 disposed at a center of the vehicle, and including vehicle control parts, driver seat convenience parts, and driver seat safety parts; and a side module 200 assembled to or separated from a side of the main module 100 corresponding to a front passenger seat, and including front passenger seat convenience parts and front passenger seat safety parts. The side module 200 may be connected to a front part of a vehicle body and a side end of the main module 100 when assembled, and when the side module 200 is separated, the space in which the side module 200 previously existed may be utilized as a storage space.

According to the vehicle cockpit module that separates the engine room from the interior of the vehicle in front of the driver and front passenger seats, the main module 100 may have a structure in which the driver module 110 disposed in front of the driver seat and including a vehicle's steering wheel, a column, a cluster, a driver seat vent, safety parts, etc. is formed integrally with the center module 120 disposed at a central front part of the vehicle and including a center air vent, a vehicle control device, a display device, etc. The side module 200 disposed in front of the front passenger seat and including vehicle convenience parts and front passenger seat safety parts may be provided as a separate part from the main module 10 and selectively coupled to the side of the main module 100.

In the above-described structure of the vehicle cockpit module, depending on the purpose of the vehicle, the main module 100 may be first coupled to the front part of the interior of the vehicle in the manufacturing line of the vehicle and then, depending on the purpose or application of the vehicle, the side module 200 may or may not be coupled to the vehicle.

Thus, a vehicle that does not require the side module 200 may be released without the side module 200 being coupled thereto, whereas a vehicle that requires the side module 200 may be released with the side module 200 being coupled thereto. This makes it possible to select an option that meets customer needs with the same vehicle platform, thereby improving the economic feasibility of the vehicle and improving customer satisfaction.

As illustrated in FIGS. 1 to 3, the side module 200 may be disposed in a vehicle in which a front passenger seat is occupied by an occupant and coupled to the main module 100, and may not be disposed in a vehicle in which a front passenger seat is not occupied by an occupant.

In the case of a general vehicle or a hailing vehicle in which a front passenger seat is occupied by an occupant, the side module 200, the vehicle may be manufactured by assembling both the main module 100 and the side module 200 to the front part of the interior of the vehicle. On the other hand, in the case of a freight vehicle in which a front passenger seat is not occupied by an occupant, only the main module 100 may be coupled to the vehicle, and a simple cover (not illustrated) may be assembled in an installation space for the side module 200 to complete the interior appearance of the vehicle.

Thus, in the case of the freight vehicle in which the side module 200 is not assembled, the cost of the side module 200 can be reduced, thereby improving economic feasibility. In addition, the installation space for the side module 200 can be secured as a storage space, so that more cargo can be stored in the space, thereby increasing storage capacity.

The driver module 110 may include the driver seat vent. The center module 120 may include the center vent. The main module 100 may include a first duct 130 communicating the driver seat vent and the center vent with each other. An air conditioning device 400 including a blower 420 and a heat exchanger 410 connected to the first duct 130 may be disposed at a front side of the main module 100 and located inside the engine room of the vehicle.

As illustrated in FIG. 1, the driver module 110 may include the driver seat vent, and the center module 120 may include the center vent. For cooling or heating through the driver seat vent and the center vent, these vents need to be connected to the air conditioning device 400. To this end, as illustrated in FIGS. 4 and 5, the first duct 130 for the communication between the driver seat vent and the center vent may be provided at a front side of the main module 100, the heat exchanger 410 connected to the first duct 130 may be provided at a front side of the center module 120, and the blower 420 may be provided at a front side of the heat exchanger 410. Thus, the air conditioning device 400 including the heat exchanger 410 and the blower 420 may be located in the engine room of the vehicle.

Conventionally, the air conditioning device 400 is disposed on the side where the side module 200 is located. However, in the present disclosure, the air conditioning device 400 is disposed on the side where the engine room is located. Thus, when the side module 200 is not coupled to the main module 100, the installation space for the side module 200 can be utilized as a storage space for cargo.

The side module 200 may include a front passenger seat vent and a second duct 210 connecting the front passenger seat vent and the first duct 130 to each other.

The side module 200 may include the second duct 210 connected to the front passenger seat vent to provide cooling and heating through the front passenger seat vent. When the side module 200 is coupled to the vehicle, the second duct 210 may be connected to the first duct 130 so that air to be cooled or heated from the air conditioning device 400 flows to the front passenger seat.

The second duct 210 may be connected to the first duct 130 in a front-and-rear direction of the vehicle.

Since the main module 100 is first coupled to the interior of the vehicle and the side module 200 is coupled thereafter, it is difficult to assemble the side module 200 laterally because of an interior trim of the vehicle. To solve this problem, the side module 200 may be coupled to the side of the main module 100 after being moved in the front-and-rear direction of the vehicle.

In this process, the first duct 130 and the second duct 210 may be connected to each other in the front-and-rear direction of the vehicle. This can improve the work efficiency of an operator.

The main module 100 may further include a cowl cross member 140 extending from the front side thereof in a left-and-right direction of the vehicle. The vehicle control parts, the driver seat convenience parts, and the driver seat safety parts may be coupled to the cowl cross member 140.

As illustrated in FIGS. 7 to 8, the main module 100 may include the cowl cross member 140 extending from the front side thereof in the left-and-right direction of the vehicle. The vehicle control parts, the driver seat convenience parts, and the driver seat safety parts provided in the main module 100 may be coupled to the cowl cross member 140.

Thus, even if an external shock occurs, the parts can be prevented from being separated from the main module 100 and thus do not injure occupants, and driver seat safety parts can be operated normally.

The present disclosure may further include a connecting part 300 extending from the front sides of the main module 100 and the side module 200 in the left-and-right direction of the vehicle and electrically connecting the main module 100 and the side module 200 to each other.

The side module 200 may include the vehicle convenience parts or the front passenger seat safety parts. Power needs to be input to these convenience parts or safety parts, and an electrical control signal also needs to be input to the convenience parts or safety parts to operate the same.

To accomplish the inputting of such power and control signals to the side module 200, the connecting part 300 may include a main wiring 310 extending inside the main module 100 in the left-and-right direction of the vehicle and connected to the main module 100, and a sub-wiring 320 extending from a rear side of the side module 200 in the left-and-right direction of the vehicle and connected to an end of the main wiring 310. The sub-wiring 320 may receive control signals and power for the front passenger seat convenience parts and the front passenger seat safety parts from the main wiring 310.

As illustrated in FIG. 6, the connecting part 300 may include the main wiring ring 310 extending inside the main module 100 and the sub-wiring ring 320 extending from the side module 200. The main wiring 310 may be and the sub-wiring 320 may be connected to each other, so that the electrical control signals and power may be transmitted to the sub-wiring 320.

In addition, the main wiring 310 may be connected to a power source and a vehicle control system provided inside the vehicle, and may connected to parts that require power and electrical control, such as convenience parts, control parts, or safety parts of the vehicle provided in the main module 100, to input power and control signals to the parts.

The side module 200 may include a side bracket 220 coupled to the vehicle body. The front passenger seat convenience parts and the front passenger seat safety parts may be coupled to the side bracket 220.

The side bracket 220 coupled to the vehicle body may be provided at a lower portion of the side module 200 to couple the side module 200 to the vehicle. Thus, the side module 200 can be integrally and firmly coupled to the vehicle by the side bracket 220.

In addition, the front passenger seat convenience parts and the front passenger seat safety parts provided in the side module 200 may be coupled to the side bracket 220. Thus, in the event of a vehicle accident, the front passenger seat safety parts can be operate normally, and the front passenger seat convenience parts can be prevented from being separated from the side module 200.

The present disclosure may further include a covering part 500 covering an end of the main module 100 and an end of the side module while connecting the ends to each other when the side module 200 is disposed at the side of the main module 100.

As illustrated in FIG. 2, the covering part 500 may cover a contact area between the side module 200 and the main module 100 and may be coupled to the main module 100 and the side module 200 while connecting main module 100 and the side module 200 to each other.

Thus, foreign substances can be prevented from entering into the gap between the side module 200 and the main module 100. Also, an improved aesthetic appearance can be achieved through the covering part 500.

The main module 100 may have a first indented portion 150 indented forwardly at an end thereof. The covering part 500 may include: a first cover 510 having a first projecting portion 514 inserted into the first indented portion 150 and projecting rearwardly at a position corresponding to the main module 100, and a second indented portion 511 indented forwardly at a position corresponding to the side module 200; and a second cover 520 connected to the side module 200 and having a second projecting portion 521 projecting from an end thereof and inserted into the second indented portion 511 of the first cover 510.

As illustrated in FIG. 2, the covering part 500 may include the first cover 510 coupled to the end of the main module 100 and the second cover 520 coupled to the side module 200. The first cover 510 and the second cover 520 may be coupled to each other to cover between the main module 100 and the side module 200.

Specifically, the main module 100 may have the first indented portion 150 indented forwardly at the end thereof. The first cover 510 may have the first projecting portion 514 inserted into the first indented portion 150 and projecting at a position corresponding to the main module 100 and the second indented portion 511 indented at a position corresponding to the side module 200. The second cover 520 connected to the side module 200 may have the second projecting portion 521 projecting forwardly from the end thereof. As the second projecting portion 521 is inserted into the second indented portion 511, the first cover 510 and the second cover 520 can be easily coupled to each other by fitting, thereby improving work efficiency.

A clip portion 512 that projects from a rear side to a front side of the first projecting portion 514 of the first cover 510 may be fastened to the first indented portion 150, and the second indented portion 511 may be fastened to the first indented portion 150 by a bolt 513.

As illustrated in FIG. 2, the clip portion 512 projecting forwardly from the first projecting portion 514 may be fitted to the first indented portion 150, and the second indented portion 511 may be bolted to the first indented portion 150 by the bolt 513. Thus, the first cover 510 can be firmly coupled to the first indented portion 150 by double fastening.

Accordingly, an objective of the present disclosure is to efficiently manufacture a vehicle by separating a cockpit on a driver seat and center fascia side where vehicle operation parts are provided from a cockpit on a front passenger seat side and coupling or not coupling the cockpit on the front passenger seat side depending on the purpose of the vehicle.

The vehicle cockpit module according to the present disclosure separates the main module formed by integrating a cockpit on a driver seat side and a cockpit on a center fascia side from the side module serving as a cockpit on a front passenger seat side and selectively couples the side module depending on the type of vehicle. Thus, a vehicle that does not require the side module can be released without the side module being coupled thereto, whereas a vehicle that requires the side module can be released with the side module being coupled thereto. This makes it possible to select an option that meets customer needs with the same vehicle platform, thereby improving the economic feasibility of the vehicle and improving customer satisfaction.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A vehicle cockpit module for a front part of an interior of a vehicle, the vehicle cockpit module comprising:
   a main module comprising a driver module corresponding to a driver seat and a center module disposed at a center of the vehicle;
   a side module configured to be assembled to or separated from a side of the main module corresponding to a front passenger seat; and
   a covering part configured to cover an end of the main module and an end of the side module while connecting the ends to each other, in response to the side module being disposed at the side of the main module,
   wherein the side module is configured to be connected to a front part of a vehicle body and a side end of the main module when assembled, and a space in which the side module previously existed is utilized as a storage space, in response to the side module being separated,
   wherein the main module has a first indented portion indented outwardly at an end thereof, and
   wherein the covering part comprises:
      a first cover having a first projecting portion configured to be inserted into the first indented portion and projecting rearwardly at a position corresponding to the main module;
      a second indented portion indented outwardly at a position corresponding to the side module; and
      a second cover connected to the side module and having a second projecting portion projecting from an end thereof and configured to be inserted into the second indented portion of the first cover.

2. The vehicle cockpit module of claim 1, wherein the driver module comprises a driver seat vent,
   the center module comprising a center vent,
   the main module comprising a first duct connecting the driver seat vent and the center vent with each other, and
   an air conditioning device comprising a blower and a heat exchanger connected to the first duct is disposed at a front side of the main module and located inside an engine room of the vehicle.

3. The vehicle cockpit module of claim 2, wherein the side module comprises a front passenger seat vent and a second duct connecting the front passenger seat vent and the first duct to each other.

4. The vehicle cockpit module of claim 3, wherein the second duct is connected to the first duct in a front-and-rear direction of the vehicle.

5. The vehicle cockpit module of claim 1, wherein the main module further comprises a cowl cross member extending from a front side thereof in a left-and-right direction of the vehicle.

6. The vehicle cockpit module of claim 1, wherein the side module is disposed in the vehicle and coupled to the main module, in response to a front passenger seat being occupied by an occupant, and is not disposed in a vehicle, in response to the front passenger seat not being occupied by an occupant.

7. The vehicle cockpit module of claim 1, further comprising a connecting part extending from front sides of the main module and the side module in a left-and-right direction of the vehicle and configured to electrically connect the main module and the side module to each other.

8. The vehicle cockpit module of claim 7, wherein the connecting part comprises a main wiring extending inside the main module in the left-and-right direction of the vehicle and connected to the main module, and a sub-wiring extending from a rear side of the side module in the left-and-right direction of the vehicle and connected to an end of the main wiring,
   wherein the sub-wiring receives control signals and power for front passenger seat convenience parts and front passenger seat safety parts from the main wiring.

9. The vehicle cockpit module of claim 1, wherein the side module comprises a side bracket configured to be coupled to the vehicle body, and
   wherein the side bracket is configured to be coupled to front passenger seat convenience parts and front passenger seat safety parts.

10. The vehicle cockpit module of claim 1, wherein a clip portion that projects from a rear side to a front side of the first projecting portion of the first cover is fastened to the first indented portion, and
    wherein the second indented portion is fastened to the first indented portion by a bolt.

* * * * *